Patented Mar. 15, 1938

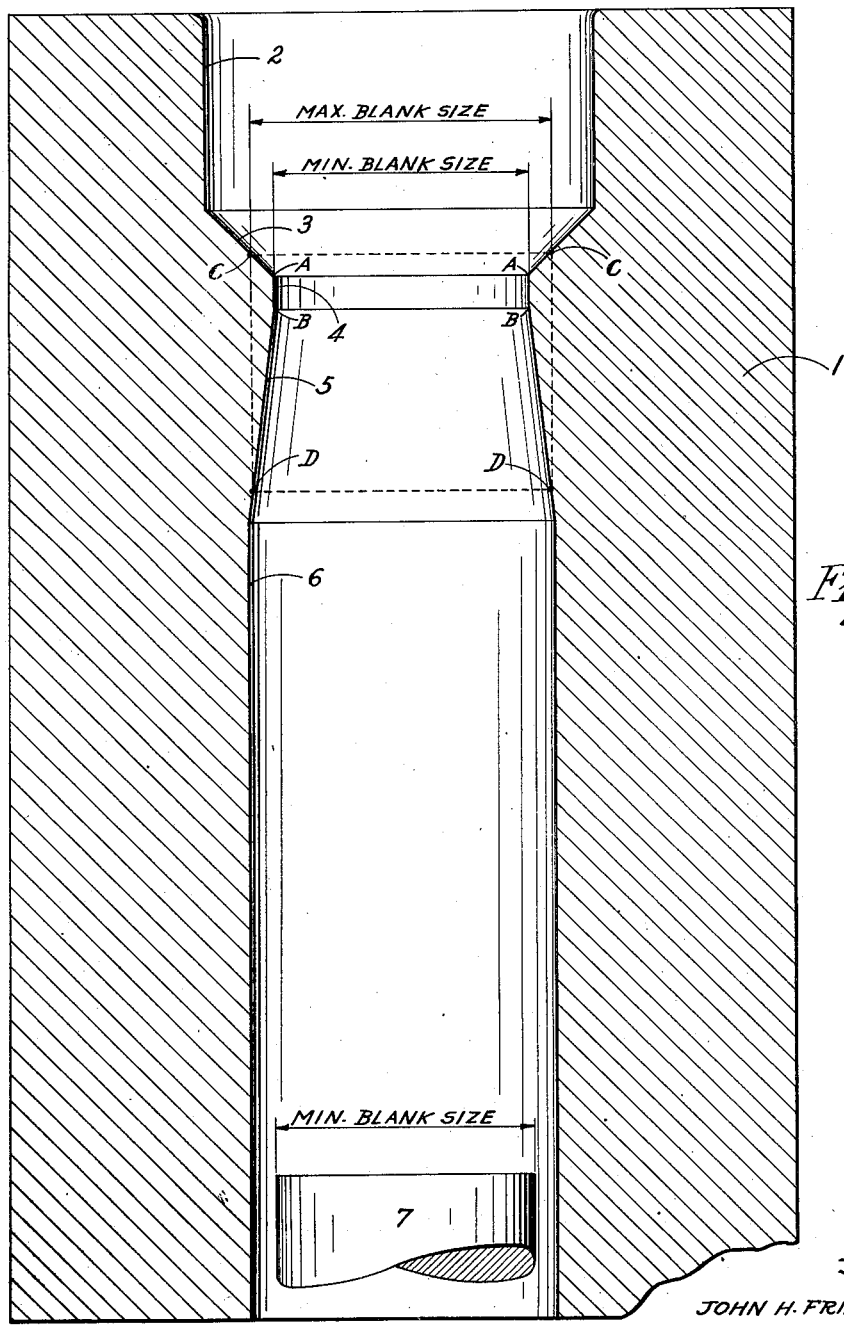

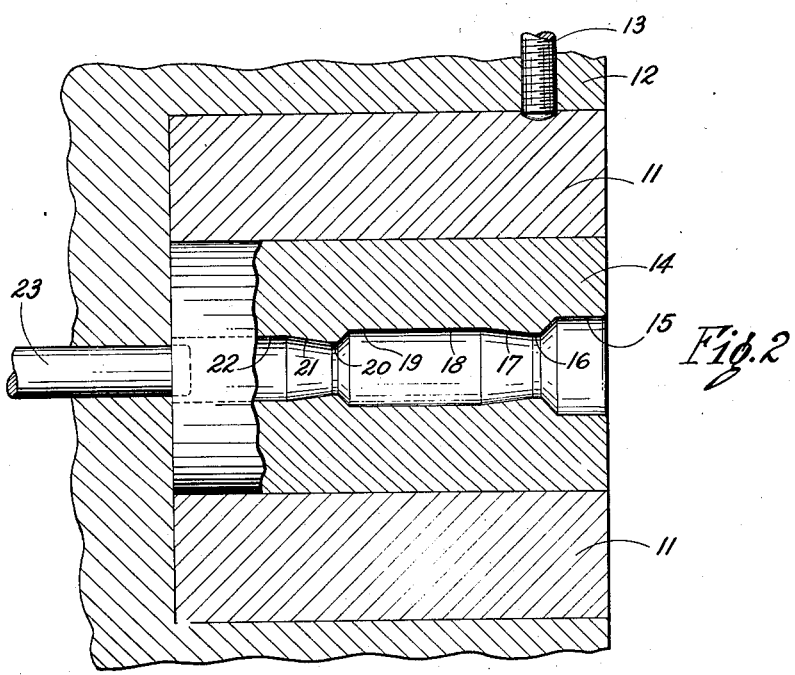
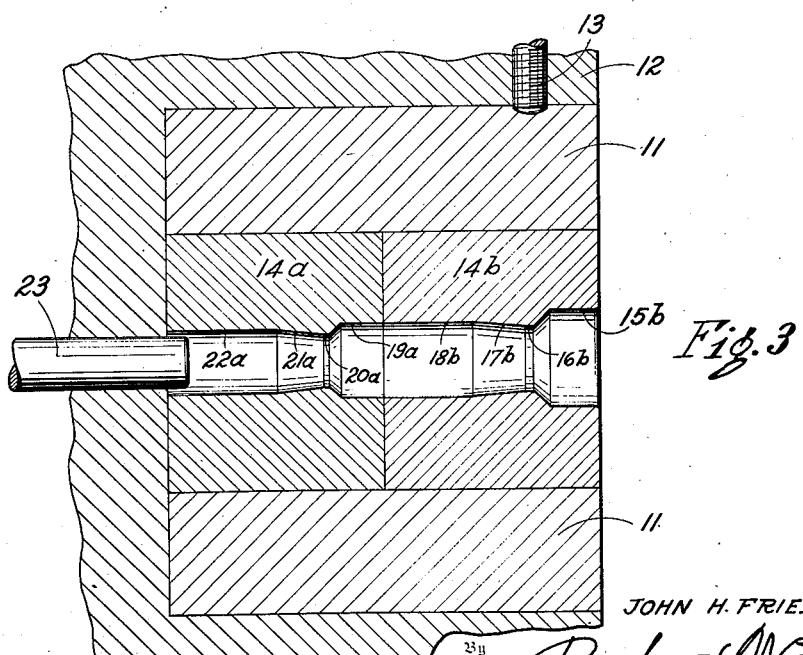

2,111,046

UNITED STATES PATENT OFFICE 2,111,046

DIE FOR FORMING BOLT BLANKS

John H. Friedman, Tiffin, Ohio, assignor to The National Machinery Company, Tiffin, Ohio, a corporation of Ohio Application January 2, 1936, Serial No. 57,213

15 Claims. (Cl. 10—24)

This invention relates to dies for forming bolts or the like and more particularly to dies for use in conjunction with the extrusion method of making bolts wherein a section of stock is pushed into a die having a restricted throat which extrudes a portion of the stock as it passes through the restricted throat.

Reference is made to my copending application Serial No. 679,933, filed July 11, 1933, Patent No. 2,030,290 issued February 11, 1936, of which the instant application is a continuation in part.

While the superiority of the product resulting from the extrusion method of making bolts and the like is generally recognized by the trade, the cost of the dies employed to carry out this process and the number of imperfect blanks produced in the dies heretofore employed has considerably affected the cost and thus prevented a wider use of this type of bolt. The practice of the extrusion method has developed the fact that the least diameter of the die throat which produces the extruded or reduced portion of the bolt blank should not engage the bolt blank along its length for a distance greater than one and one-half bolt blank diameters. In the event that the least diameter of the die be shaped or worn to a point where it engages the extruded portion of the shank for more than one and one-half diameters the binding or frictional fit set up in this engaging area will "jam" the blank in the die and prevent its successful extrusion or ejection and often results in damage to the bolt making machine. Recognizing the fact that bolt blanks could not be successfully extruded when the axial engaging area is greater than one and one-half diameters numerous efforts have been made to shape the extrusion throat to provide a lesser area in which the bolt blank might bind or stick. Among the dies resulting from said efforts is a die wherein a relatively short extrusion land; that is, a land considerably less than one diameter is provided with a bevelled face extrusion throat on each side thereof. In this type of die the axial bore back of the extrusion land is considerably greater than the diameter at the land. The in-stroke or extruding action in said type of die is operatively successful, but on the ejecting stroke the pressure of the ejector rod tends to swell the extruded portion of the shank somewhat and as the blank is being ejected an extruding action is set up on the inner side of the extrusion land with the result that a small ring or annulus is extruded at the tip of the blank and is sheared off within the die by the passage of the ejector pin into the extrusion land. The extruded and sheared ring or annulus is trapped within the die by the land and a series of said rings soon effectively prevents continued operation of the die.

Another type of extrusion die heretofore used is provided with a relatively short extrusion land such as will not bind the bolt blank when the die is new and a taper extending from the land to the end of the die. The disadvantage of extruding on the ejecting stroke pointed out in the above paragraph may be overcome by the reducing action of the taper as the blank is being ejected. When a long blank is being extruded in this long taper type of extrusion die it will be observed that the diameter at the ejector end of the die will be considerably greater than the minimum diameter of the die at the extrusion land and thus a blank may tilt about the extrusion land as a fulcrum. This tilting takes place during the ejecting stroke and upon ejection the tilted blank will be deformed and acquire a curved, or other unusual shape as it passes through the extrusion land. It is obvious that a blank with the slightest curvature or deformation in the shank must be discarded and that the cost of inspecting and handling blanks with a percentage of curved or deformed blanks will be considerable.

Another of the disadvantages growing out of the use of dies having a taper from the extrusion land to the rear end of the die is the relatively short die life. The die is initially formed or shaped when new to have an extrusion land diameter which is equal to the minimum tolerance acceptable on the blanks being formed. The die is progressively worn by each successive extrusion on the extrusion land portion, the bevelled face on the forward side of the land and on the long tapered face at the rear side of the land, and this wear may continue until the land is worn to an axial extent equal to about one diameter of the blank. If worn beyond this extent up to about one and one-half diameters the blank will jam in the die as heretofore pointed out. The diameter of the worn land, however, is less than the diameter of a blank having maximum permissible tolerance and thus the die must be discarded before the blanks have reached the maximum tolerance. In other words, the life of the die is limited by the binding or jamming effect at the land rather than by normal wear in the die up to the maximum permissible tolerance.

It is among the objects of my invention to provide an extrusion die which will have a longer productive life and one which will wear throughout the range of tolerance permissible upon the blanks being produced. Another object of my invention is to provide an extrusion die which will maintain the blanks in axial alignment with the bore of the die during the ejecting stroke and which will permit the ejection without any re-extrusion or "ring cutting" taking place upon the ejecting stroke. A further object of the invention is to provide a die having an extrusion throat which presents a larger volume of wearing material and hence a longer successfully productive life than in the dies heretofore provided. A further object of the invention is to provide an extrusion die which will wear and be successfully operative throughout the range of permissible bolt blank tolerances. A further object of the invention is to provide an improved die assembly according to my said patent and according to the preceding objects in which as disclosed in said patent a single die station is provided with extrusion means adapted to reduce a portion of the length of a blank to the pitch diameter of the rolled threads and effect a lesser reduction throughout another portion of the blank. A further object of the invention is to provide a composite two-part die insert according to the preceding object. Further objects and advantages relating to economies and simplicity of manufacture will appear from the following description and the attached drawings wherein:

Figure 1 is a transverse sectional view of a die constructed according to my invention with certain proportions exaggerated in order to more graphically illustrate relationships of die parts;

Figure 2 is an elevation in section of a die station having two extrusion throats spaced axially with respect to each other;

Figure 3 is a sectional view similar to Figure 2 of a composite or two-part die insert constructed according to my invention.

In the drawings the die generally indicated at 1 is preferably circular in outer contour and is adapted to be received by a die holder arranged in the bed frame of a machine (not shown). The guiding bore of the die immediately adjacent the end face thereof as at 2 is provided with a diameter corresponding to the diameter of the rod or wire stock first entering the die. The portion 2 which is cylindrical terminates in a bevelled extrusion face 3 extending inwardly and terminating in a cylindrical extrusion land which constitutes the least diameter of the extrusion throat, that is, it corresponds to the diameter of a bolt blank having the minimum permissible tolerance. A tapered reducing face 5 extends from the rear side of the land and joins an axial bore 6 which is provided with a diameter which is a little greater than the diameter of a bolt blank having the maximum permissible tolerance. As illustrated the slope of 5 and the distance between lines C—D and A—B is somewhat exaggerated. The portion of the die at 6 is cylindrical and extends rearwardly to the end of the shank forming portion of the die which is closed by an ejector rod 7. The diameter of the ejector rod 7 corresponds to the diameter of the extrusion land 4 and passes therethrough during the ejecting stroke in the die. During the extrusion process the land 4 and its adjoining faces 3 and 5 are gradually worn down and the effective length of land is increased until the tapered bore 5 substantially disappears. At this point in the wear of the die the land is preferably equal to about one diameter in axial extent as indicated by the dotted line C—D. Wear beyond this point is prohibited by the fact that a blank would bind and jam in the die as heretofore pointed out. Furthermore when the die is worn to this point the land diameter corresponds to the maximum permissible tolerance and the die should be discarded for this reason.

The cross section of the annulus worn away at the extrusion throat as the die wears from the minimum to maximum tolerance is indicated by the trapezoid A—B—D—C. During the wearing away of this annulus the greatest wearing surface is presented as the wear approaches the line C—D and thus a large number of bolt blanks may be successfully extruded as the blanks approach the maximum permissible tolerance, an advantage peculiar to my improved type of die over dies which are prevented by certain factors from wearing to the maximum permissible tolerance.

As disclosed in my patent above referred to, the improved bolt making method contemplates the use of a die having two spaced extrusion throats whereby in a single advancing movement of a blank reductions of different diameters are effected on different portions of the blank. My invention as more specifically described in connection with the die of Figure 1 has distinct advantages in combination with this double type of die which for the sake of convenience will be referred to as a double extrusion die inasmuch as a part of the stock which is extruded in the first throat is further extruded as it is forced into the second throat. Although the distance between the two extrusion throats may be varied within relatively wide limits, it will be understood that when it is desired to form certain types of bolts, for instance a bolt having but a few threads adjacent the outer end of the shank and the major portion of the shank of over-all thread diameter, it is necessary to guide the blank from the first extrusion to the second. With a conventional relief or constant tapered flare at the rear of the extrusion throat, it will be apparent that maximum diameter of the flare at the end of the relief would be greater than the diameter of the entrance portion in the second extrusion die and thus the axial bore between the two extrusion throats would not present a smooth cylindrical guiding portion. According to my invention the axial bore at the rear of the extrusion throat functions to guide the blank from the first extrusion to the second.

A die 11 as shown in Figure 2 is preferably provided with an axial bore proportioned to receive a die insert 14 formed of carboloy or similar hard wear resisting die material. The die 11 as a unit is inserted within a die station formed in the die holder 12 and an axial bore in the die holder at the rear of the die permits the reciprocation of the ejector rod 23. The die insert entrance at 15 may be proportioned to receive a blank of stock diameter and this portion 15 which may be referred to as the die entrance portion terminates in an extrusion throat 16. A taper or flare 17 is provided at the rear of the extrusion throat as more fully described above in connection with the description of the die of Figure 1 and said taper or flare merges into the cylindrical wall 18. The wall 18 is proportioned axially according to the unthreaded length desired in the finished article and near the end thereof as at 19 serves as an entrance die portion for the second extrusion throat 20. Rearwardly of the extrusion throat 20 a taper or flare 21 is provided and merges into a cylindrical portion 22 as in a manner heretofore described.

Difficulties may be encountered in the making of a double extrusion die due to the fact that the diameter as at 18 is greater than the diameter at 16 and 20 and that the tapered or flared portions require very accurate machining. Since the blank portion being fed to the second extrusion throat in this type of die is accurately shaped and is accurately guided into the extrusion throat 20 I appreciate that the rate of wear on the outer extrusion throat 16 will exceed that on the inner throat. To overcome the difficulties connected with the manufacture of a double extrusion die and to take advantage of the fact that one of the extrusion throats will wear longer than the other I have provided as shown in Figure 3 a two-part insert for the double extrusion die construction.

In this embodiment the die holder 11 receives with a tight pressed fit an insert comprising parts 14a and 14b, the part 14b being bored as at 15b to receive the blank stock. The extrusion throat 16b, flare 17b and cylindrical portion 18b correspond to the parts 16 to 18 of the die of Figure 2. The portion 19a which serves as the second extrusion throat entrance is provided with a diameter corresponding to the diameter of the cylindrical part 18b and the combined axial lengths of 18b and 19a correspond to the unthreaded over-all shank diameter in the finished blank. The second extrusion throat 20a, the flare 21a and cylindrical portion 22a are proportioned as described in connection with the dies of Figures 1 and 2. By forming the die insert in two parts as shown in Figure 3 it will be observed that all of the die portions may be conveniently machined from one side or the other of the individual insert parts. Thus the flare at 17b may be formed from the rear face of the insert part 14b and the forming of the cylindrical portions 18b and 19a are merely straight boring operations.

When the extrusion throat 16b is worn out; that is, the blanks extruded thereby reach the maximum within the tolerance range and the throat has reached the limit of its axial extent as more fully described above, the die insert 14b may be replaced by a new insert part (similar to 14b) and the insert 14a may be reassembled with said new insert part and used therewith until the throat 20a reaches the limit of its wear. Thus a two-part insert for a double extrusion die according to my invention permits the extrusion throats to be worn to their fullest extent. A further advantage of the two-part insert assembly is that various combinations may be worked out between the insert parts 14a and 14b with respect to the distance between the extrusion throats. For instance the insert 14a may be replaced by an insert wherein the extrusion throat 20a is more nearly adjacent the rear face of the insert and the insert 14b will co-operate in the new assembly to form blanks having a longer unthreaded portion with respect to the pitch diameter portion than could be formed in the dies shown in Figure 3.

Although the land 4 is illustrated as having some axial extent, those skilled in the art will appreciate that the surfaces 3 and 5 may come to a point here and the term land as used herein after identifies the restricted portion of the die whatever its axial extent may be. I have indicated that the tapered portion 5 should terminate or merge with the axial bore 6 at a point where the worn engaging surface will be equal to one diameter. This proportion may be varied somewhat depending upon the size and nature of the bolt blank forming materials and the tolerances within which the blanks may be made. As referred to above the slope 5 should be sufficiently gradual to prevent a re-extrusion or a shearing of a ring upon ejection. I have found in this connection that the axial extent of the surface 5 may be as short as half a diameter with ordinary stock. In some instances or with wider tolerance ranges the line C—D may approach one and one-half diameters and the diameter of the portion 6 may vary somewhat from that shown.

Referring to that type of die illustrated in Figures 2 and 3 wherein a length of stock is acted on by two extrusion throats, I appreciate that in certain types of bolt blanks requiring but a limited axial extent of large diameter, that the cylindrical portion intermediate the extrusion throats may be dispensed with. For instance, it is within the teachings of my invention to form a die wherein the flared portion 17 of Figure 2 or 17b of Figure 3 terminates at the bevelled entrance of the second extrusion throat 20 or 20a. It will be observed that the axial extent of the resulting blank will be limited to the axial extent of the flared portion 17 or 17b plus the axial extent of the bevelled entrance portion of the second extrusion die 20 or 20a. With reference particularly to the two-part insert die of Figure 3 I also appreciate that the insert part 14b may be so proportioned or formed that the flare 17b terminates at the rear face of said insert part and thus said insert part will be free of any cylindrical guiding portion. With respect to the above suggested variations I contemplate that the flare 17 or 17b should be proportioned substantially as heretofore described in connection with the die of Figure 1 and that the most forward extrusion throat 16 or 16b of such assembly will possess the advantages regarding wear, economy and accuracy inherent in this construction.

Although Figures 2 and 3 illustrate a die having two extrusion throats each proportioned to effect a substantial reduction of the blank it will be understood by those skilled in the art that depending upon the material being extruded and the diameter variations desired therein, three or more extrusion throats may be arranged in the same die. For instance, in certain industries there exists a demand for a type of bolt or screw which is provided with an unthreaded portion of greater diameter than the over-all diameter of the threads and with an unthreaded portion adjacent thereto corresponding to the over-all diameter of the threads. This type of bolt is adapted to be formed by a die insert having three axially spaced extrusion throats wherein the inner-most extrusion throat reduces a portion of the blank to the pitch diameter of the threads, an intermediate extrusion throat reduces an intermediate portion of the blank to the over-all diameter of the threads and an outer-most extrusion throat reduces the blank to a diameter exceeding that of the over-all thread diameter. An unthreaded portion of the length of stock may be upset in the usual manner to form a head.

Although I have described certain embodiments of my invention in considerable detail, it will be appreciated that alterations and variations therein may be made without departing from the spirit of the invention as indicated by the claims.

I claim:

1. In a die for forming bolt blanks or the like, an extrusion bore corresponding to the length of the bolt blank provided with an entrance portion of stock diameter, an extrusion throat having an extrusion face joining an extrusion land, a tapered bore extending from said extrusion land to the main body of the extrusion bore, said extrusion bore being cylindrical from the tapered portion to the rear end of the die and having a lesser diameter than the entrance portion of the die.

2. In an extrusion die for forming bolt blanks or the like, a cylindrical guiding portion adjacent the forward face of the die proportioned to receive rod stock forced into the die, said guiding portion terminating in a bevelled extrusion face, a cylindrical extrusion land extending from said face inwardly and joining a tapered die portion having a gradually increasing diameter, a cylindrical portion arranged intermediate said tapered portion and the closed end of the die, said last named cylindrical portion having a diameter greater than said extrusion land and less than said cylindrical guiding portion at the face of the die.

3. An extrusion die for forming bolt blanks or the like having an extrusion throat with a bevelled extrusion face and a cylindrical extrusion land, a tapered portion extending from said land having a gradually increasing diameter and merging inwardly of the die with a cylindrical blank guiding portion which extends to the ejector end of the die, the diameter of said extrusion land corresponding to the diameter of the extruded shank of a bolt blank having the least diameter within the tolerance range and the diameter of said last named cylindrical portion approximately to the diameter of the extruded shank of a bolt blank having the greatest diameter within the tolerance range.

4. An extrusion die having an axial bore closed at one end by an ejector rod, said bore being cylindrical intermediate the closed end thereof and an extrusion throat positioned adjacent the open end of the die, the diameter of said cylindrical portion approximately corresponding to the diameter of the extruded shank of a bolt blank having the greatest diameter within the tolerance range whereby said extrusion throat may progressively wear and permit blank ejection until the throat diameter approaches a diameter equal to said cylindrical portion.

5. A die for forming bolt blanks or the like comprising an axial bore closed at one end by an ejector rod, a cylindrical blank guiding portion at the open end of said die terminating in an extrusion face having the least diameter equal to the diameter of a blank having the minimum acceptable shank diameter, an extrusion land extending inwardly from said extrusion face, a cylindrical shank guiding portion extending forwardly from the closed end of the die towards said land and joined thereto by means of a tapered portion having its greatest diameter at said cylindrical end and its least diameter at said land, said greatest diameter corresponding to the diameter of a bolt blank having the greatest acceptable diameter within the tolerance range whereby the extrusion throat is worn to have its permissible maximum wear engaging surface at the time when its least diameter approaches the diameter of said cylindrical blank guiding portion.

6. A die for forming bolt blanks and the like having an extrusion throat comprising an extrusion land with an extrusion face on its forward side and a tapered face on its rearward side, said tapered face and said extrusion land having an axial extent of substantially one diameter of a bolt blank whereby when said extrusion land and tapered face are worn away by successive extrusions the engaging area of the extrusion throat will be less than one and one-half diameters.

7. An extrusion die for forming bolt blanks or the like having a main axial bore corresponding to the diameter of the extruded shank having the maximum permissible tolerance, whereby a blank having the maximum tolerance diameter will slide freely in the bore and yet will have insufficient clearance to tilt in the bore, an extrusion throat arranged at the open end of said cylindrical bore having a least diameter corresponding to the diameter of the extruded shank of bolt blank having the minimum permissible tolerance diameter, a tapered portion extending from said least diameter to said cylindrical bore having an axial extent of about one blank diameter whereby when said extrusion throat is worn away to have a blank engaging axial extent equal to about one blank diameter, the least diameter of said throat will correspond substantially to said cylindrical bore.

8. An extrusion die for forming bolt blanks or the like having a main axial bore proportioned to provide a sliding non-tilting clearance for the extruded shank of a blank having the maximum permissible tolerance, an extrusion throat arranged at the open end of said cylindrical bore having a least diameter corresponding to the diameter of the extruded shank of bolt blank having the minimum permissible diameter, a tapered portion extending from said least diameter to said cylindrical bore having an axial extent insufficient to bind and grip a blank therein when said extrusion throat is worn away to substantially remove said tapered portion whereby the least diameter of said throat will correspond substantially to said cylindrical bore, a knockout pin arranged to move within said die and eject the blank therefrom, said pin having a diameter approximating the minimum diameter of the extrusion throat.

9. A bolt blank forming die having a bore of substantially stock diameter adjacent the face of the die, said bore terminating in a bevelled face extrusion throat, a tapered portion extending rearwardly from said throat, a cylindrical portion joining said tapered portion and extending axially rearwardly therefrom and terminating in a second bevelled face extrusion throat of less diameter than said first extrusion throat, a tapered face extending rearwardly from said last named extrusion throat, a cylindrical bore joining said last named tapered face and extending rearwardly therefrom to the rear face of the die.

10. An extrusion die for forming bolt blanks or the like comprising an insert, an entrance portion leading from one face of said insert and terminating in an extrusion throat, a tapered portion extending rearwardly from said extrusion throat, a cylindrical portion of greater diameter than said extrusion throat extending axially from said tapered portion and terminating in an extrusion throat of lesser diameter than said first named extrusion throat whereby a relief is provided intermediate said extrusion throats and said cylindrical portion guides the blanks from said first extrusion throat into said second extrusion throat.

11. An extrusion die for forming bolt blanks or the like comprising an insert formed of two axially aligned parts, an extrusion throat formed in one of said parts, a tapered portion extending rearwardly from said extrusion throat and a cylindrical portion joining said tapered portion and extending axially therefrom to the rear face of said one insert part, an extrusion throat formed in the other of said insert parts concentrically arranged with respect to said first named extrusion throat and having a diameter less than the diameter of said first named extrusion throat, said last named extrusion throat provided with a cylindrical entrance portion having a diameter corresponding to the diameter of the cylindrical portion in said one insert part.

12. A bolt blank forming die having a bore of substantially stock diameter adjacent the face of the die, said bore terminating in a bevelled face extrusion throat, a tapered portion extending rearwardly from said throat, a second bevelled face extrusion throat of less diameter than said first extrusion throat arranged adjacent the terminus of said tapered portion, a tapered face extending rearwardly from said last named extrusion throat, a cylindrical bore joining said last named tapered face and extending rearwardly therefrom to the rear face of the die.

13. A die for forming bolt blanks and the like having an entrance bore corresponding to stock diameter, an extrusion throat comprising an extrusion land with an extrusion face on its forward side and a tapered face on its rearward side, said extrusion land having a diameter corresponding to the minimum blank size within the tolerance range of the resultant blanks, a cylindrical bore adjacent said tapered portion having a diameter less than said entrance bore diameter and greater than said land diameter, an ejector pin mounted to reciprocate in said cylindrical bore, said tapered face shaped and proportioned with respect to said land diameter and with respect to said cylindrical bore to effectively guide the extruded portion of a blank out of the die upon ejection without re-extruding a portion of the extruded blank or shearing a ring therefrom by action of the ejector rod during the ejecting movement.

14. An extrusion die for forming bolt blanks and the like comprising an axial bore corresponding to the length of the blank, said bore closed at one end by an ejector rod, an extrusion throat adjacent the face of said die remote from said rod having a bevelled extrusion face and an adjoining cylindrical land, a tapered portion merging with and flaring away from said extrusion land provided with a lesser inclination than said extrusion face and a cylindrical shank guiding portion extending from said tapered portion to the end of the die, the diameter of said cylindrical shank guiding portion being less than the maximum diameter of said bevelled extrusion face.

15. A die for forming bolt blanks and the like having an extrusion throat comprising an extrusion land with an extrusion face on its forward side and a tapered face on its rearward side, said extrusion land having a diameter corresponding to the diameter of the minimum blank size within the tolerance range of the blanks formed thereby, said tapered face terminating in a bore having a diameter less than the diameter of the unextruded blank stock and exceeding the diameter of the maximum blank size within the tolerance range of said blanks said tapered face being proportioned with respect to said land diameter so that when said extrusion throat is worn to the maximum permissible blank diameter the axial extent of the resultant worn land will be insufficient to bind and grip a blank therein.

JOHN H. FRIEDMAN.